(12) United States Patent
Van Rensburg et al.

(10) Patent No.: US 12,210,582 B2
(45) Date of Patent: Jan. 28, 2025

(54) SYSTEMS AND METHODS FOR GENERATING A RESOURCE PREVIEW IN A COMMUNICATION SESSION

(71) Applicant: RingCentral, Inc., Belmont, CA (US)

(72) Inventors: Christopher Van Rensburg, Foster City, CA (US); Martin Arastafar, Redwood City, CA (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 18/355,606

(22) Filed: Jul. 20, 2023

(65) Prior Publication Data

US 2023/0359690 A1    Nov. 9, 2023

Related U.S. Application Data

(63) Continuation of application No. 15/721,838, filed on Sep. 30, 2017, now abandoned.

(51) Int. Cl.
| | | |
|---|---|---|
| *G06F 15/16* | (2006.01) | |
| *G06F 16/9535* | (2019.01) | |
| *G06F 16/958* | (2019.01) | |
| *G06Q 10/101* | (2023.01) | |
| *H04L 12/18* | (2006.01) | |
| *H04L 51/02* | (2022.01) | |

(52) U.S. Cl.
CPC ........ *G06F 16/972* (2019.01); *G06F 16/9535* (2019.01); *G06Q 10/101* (2013.01); *H04L 12/1827* (2013.01); *H04L 51/02* (2013.01)

(58) Field of Classification Search
CPC . G06F 16/972; G06F 16/9535; G06Q 10/101; H04L 12/1827; H04L 51/02; H04L 51/04
See application file for complete search history.

(56) References Cited

U.S. PATENT DOCUMENTS

| | | |
|---|---|---|
| 5,974,446 A | 10/1999 | Sonnenreich et al. |
| 7,996,673 B2 | 8/2011 | Ivanov et al. |
| 8,417,715 B1 * | 4/2013 | Bruckhaus ............ G06Q 10/04 705/26.1 |
| 8,813,196 B2 | 8/2014 | Weller et al. |
| 9,117,062 B1 | 8/2015 | Fitch et al. |
| 9,225,690 B1 | 12/2015 | Fitch et al. |
| 9,584,343 B2 | 2/2017 | Brezina et al. |
| 10,380,228 B2 | 8/2019 | Lee |
| 2005/0060381 A1 | 3/2005 | Huynh et al. |
| 2006/0167992 A1 | 7/2006 | Cheung et al. |

(Continued)

OTHER PUBLICATIONS

"oEmbed", downloaded at https://oembed.com/#section2, (22 pages) accessed Sep. 28, 2017.

*Primary Examiner* — John B Walsh
(74) *Attorney, Agent, or Firm* — Finnegan, Henderson, Farabow, Garrett & Dunner, LLP

(57) ABSTRACT

Systems and methods are provided for generating a resource preview in a communication session. The systems and methods may include receiving a link associated with a resource from a sender to a recipient. The systems and method may further include displaying a resource preview as a function of the received link and a stored preview-setting profile. The preview-setting profile may include a recipient-based preview setting, an environment-based preview setting, or a sender-based preview setting.

22 Claims, 10 Drawing Sheets

(56) References Cited

U.S. PATENT DOCUMENTS

| | | |
|---|---|---|
| 2008/0126953 A1 | 5/2008 | Davidson et al. |
| 2010/0293230 A1 | 11/2010 | Lai et al. |
| 2011/0208822 A1 | 8/2011 | Rathod |
| 2014/0040059 A1 | 2/2014 | Barabas et al. |
| 2014/0129942 A1 | 5/2014 | Rathod |
| 2014/0195621 A1 | 7/2014 | Rao Dv |
| 2014/0237626 A1 | 8/2014 | Marcus et al. |
| 2014/0279647 A1 | 9/2014 | Tolcher |
| 2015/0140896 A1* | 5/2015 | Maiti ..................... A63H 3/28 446/484 |
| 2015/0278234 A1 | 10/2015 | Masterson et al. |
| 2016/0037195 A1 | 2/2016 | Shin et al. |
| 2016/0255024 A1 | 9/2016 | Tichauer et al. |
| 2016/0378999 A1 | 12/2016 | Panchapakesan et al. |
| 2017/0187521 A1 | 6/2017 | Fitch et al. |
| 2018/0129637 A1 | 5/2018 | Lantwin et al. |
| 2018/0191686 A1 | 7/2018 | Ghafourifar |
| 2019/0019160 A1* | 1/2019 | Champaneria ........... G06N 5/04 |
| 2019/0155856 A1* | 5/2019 | Tian ........................ G06F 16/00 |

* cited by examiner

SYSTEMS AND METHODS FOR GENERATING A RESOURCE PREVIEW IN A COMMUNICATION SESSION

CROSS REFERENCE TO RELATED APPLICATIONS

This is a continuation of U.S. patent application Ser. No. 15/721,838, filed Sep. 30, 2017, the disclosure of which is incorporated herein by reference.

TECHNICAL FIELD

The present disclosure relates to the field of telecommunications, and more specifically, to systems and methods for generating a resource preview in a communication session.

BACKGROUND

Communication software applications, such as a chat application, provide a platform for multiple users to communicate with each other remotely in a communication session across a network. One user—a sender—in the communication session may want to share a resource with another user—a recipient. The resource may be, for example, a document or a website. The sender may provide the recipient with a link to the resource that may be selected by the recipient to access the resource. When the sender sends the link and/or when the recipient receives the link, the communication software may display information from or about the resource to the recipient. The information from or about the resource may be a preview of the resource. But existing communication systems fail to tailor previews to individual users viewing the previews, resulting in generic previews or no previews being displayed if, for example, some users may not be authorized to view the preview.

SUMMARY

Presently disclosed embodiments are directed to systems and methods for generating a resource preview in a communication session and generating a resource recommendation in a communication session. In one embodiment, a method for generating a resource preview in a communication session may include receiving a link associated with a resource from a sender to a recipient and displaying a resource preview as a function of the received link and a stored preview-setting profile. In some embodiments, the preview-setting profile may comprise at least one of a recipient-based preview setting, an environment-based preview setting, or a sender-based preview setting. In some embodiments, displaying the resource preview may comprise generating the resource preview based on at least one of a received recipient profile, data derived from a communication session, data derived from an environment associated with the recipient, a received sender profile, or a received sender selection. In some embodiments, the displaying may be performed by a chat application. In some embodiments, the preview-setting profile may be associated with at least one of the sender or the recipient. In some embodiments, the environment-based preview setting may comprise a setting to display a resource preview based on the content of the communication session. In some embodiments, the method may also include displaying the link, determining that the resource was updated, and updating the link and/or providing credentials from the sender to recipient, wherein the credentials permit temporary or permanent access to the resource for the recipient. In some embodiments, displaying the resource preview may comprise displaying the resource preview as a function of the recipient's credentials. The resource recommendation may also be displayed as a function of a recommendation-setting profile.

In another embodiment, a method for generating a resource recommendation in a communication session may include storing a recommendation-setting profile comprising at least one of a sender-based recommendation setting, an environment-based recommendation setting, or a recipient-based recommendation setting; displaying a resource recommendation as a function of the recommendation-setting profile and receiving a request to send a link associated with a resource from a sender to a recipient. In some embodiments, displaying the resource recommendation may comprise generating the resource recommendation based on at least one of a received sender profile, data derived from a chat session, data derived from an environment associated with the sender, or a received recipient profile. In some embodiments, the displaying may be performed by a chat application. In some embodiments, the recommendation-setting profile may be associated with at least one of the sender or the recipient. In some embodiments, the request may be associated with a communication session and the environment-based recommendation setting may comprise a setting to display a resource recommendation based on the content of the communication session. In some embodiments, the method may include displaying the link, determining that the resource was updated, and updating the link and/or providing credentials from the sender to recipient, wherein the credentials may permit access to the resource. In some embodiments, displaying the resource recommendation may comprise displaying the resource recommendation as a function of the recipient's credentials. A resource preview may also be displayed as a function of a preview-setting profile.

In another embodiment, a system for generating a resource preview in a communication session may include at least one memory device storing computer-executable instructions and at least one processor configured to execute the stored instructions to receive a link associated with a resource from a sender to a recipient and display a resource preview as a function of the received link and a stored preview-setting profile.

Consistent with yet other disclosed embodiments, non-transitory computer-readable storage media can store program instructions, which are executed by at least one processor device to perform any of the methods described herein.

The foregoing general description and the following detailed description are explanatory only and are not restrictive of the claims.

BRIEF DESCRIPTION OF THE DRAWINGS

The accompanying drawings, which are incorporated in and constitute a part of this disclosure, illustrate several embodiments and, together with the description, serve to explain the disclosed principles. In the drawings.

DETAILED DESCRIPTION

Existing communication systems, such as chat and collaboration systems, may treat all users the same when generating previews for resources shared over the communication system (e.g., documents or websites). Consequently, the same preview of a resource may be presented to all users with whom a link to the resource is shared. Such system may not, for example, consider the different levels of access to the resource that may be afforded to different users based upon their unique roles, interests, levels of understanding, or permissions within an organization.

Existing communication systems fail to tailor previews to individual users viewing the previews. Existing systems may only display previews for resources that all users who may view the previews are authorized to view. This may limit the content that can be previewed. For example, if a user references a resource by sending a link to the resource and that resource requires other users to login and authenticate with a service to access it, then the preview system may provide a generic representation of the resource, such as text of a Uniform Resource Locator (URL), specifying a network location at which the resource may be located.

A communication system that tailors previews of resources to individual users may allow users to see portions of resources that are, for example, of most interest to them and that they are authorized to see. The previews may be presented in a format useful for consumption by the user (e.g., text or audio). The communication system may redact portions of resources and/or may generate summaries of varying degrees of complexity or detail for presentation to one or more users.

Other features and advantages of the present embodiments are discussed in further detail below with respect to the figures.

Figure 1A:
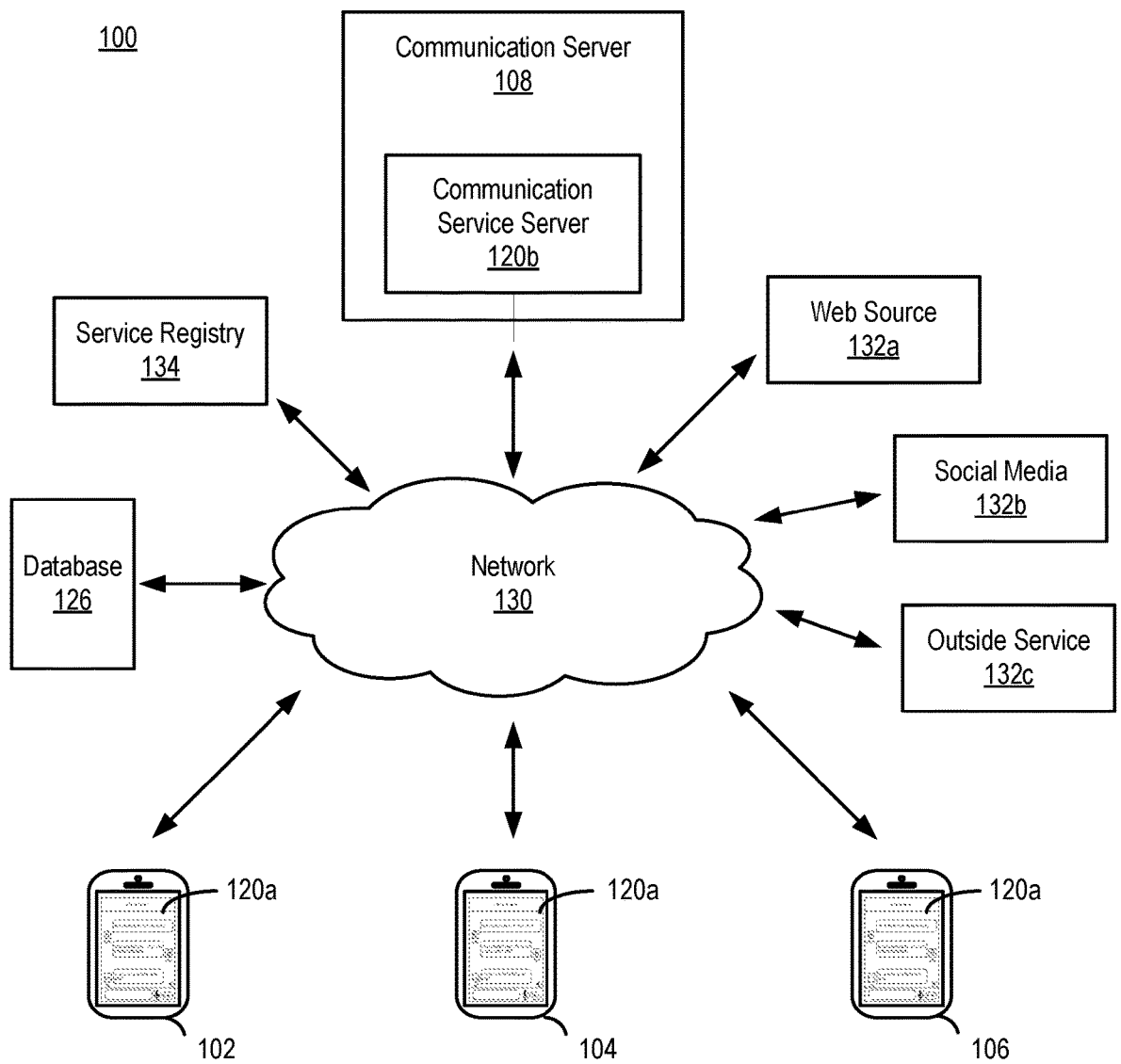
FIG. 1A is a diagram of an example of a system environment for a communication service, consistent with the disclosed embodiments.

FIG. 1A is a diagram of an example of a system environment 100 for a communication service, such as a chat service, consistent with embodiments of the present disclosure. A communication service can be provided to user devices 102, 104, and 106 (e.g., smart phones). The communication service may allow users of the devices to communicate with each other over a communication session. The users may communicate via, for example, chat messages. The users may communicate remotely over network 130 via a communication server 108. The communication service can be provided by a communication application 120, illustrated in FIG. 2. Communication application 120 may be run on a communication-service client 120a and/or a communication-service server 120b. Communication-service client 120a can operate on user devices 102, 104, and 106. Communication-service server 120b can operate on communication server 108.

As discussed below with respect to FIG. 1B, communication-service client 120a may display a preview of a resource referenced in the communication session. For example, communication-service client 120a may display an excerpt or a portion of a document when one user (i.e., sender) sends a link to the document to another user (i.e., recipient) or users (i.e., recipients). Generating the preview or a recommendation for the preview may comprise accessing data from a database 126. It is to be understood that database 126 may be one or more databases. The data stored in database 126 may comprise data from a current communication session and/or one or more previous communication sessions. Communication application 120 may access database 126 to retrieve stored communication sessions and analyze them to determine what resource preview to generate or recommend. In some embodiments, some of this analysis may be performed when previous communication sessions are stored in database 126 or at another time. For example, an index that pairs words found in communication sessions to the communication sessions in which they are found may be created or updated when the communication session is stored in database 126.

Generating the preview, a recommendation for the preview, or a recommendation of a resource may comprise accessing database 126 to retrieve stored user-attribute data. User-attribute data may describe one or more characteristics about a given sender or recipient. User attributes for users may include, for example, their access privileges to various types of resources, their positions or responsibilities within an organization, their security clearance levels or access credentials, their interests, their training or academic qualifications, their professional expertise in the subject matter of the preview, their involvement with the subject matter of the preview, and/or their levels of understanding of various subjects. Generating the preview, a recommendation for the preview, or a recommendation of a resource may also comprise accessing database 126 to retrieve stored user-activity data. User-activity data may describe the activities in which a given sender or recipient participates in, such as a user's online activity. By tracking the user's, for example, online activity, the system may create user-attribute data, such as by finding words that commonly appear on websites accessed by the user or that appear in the user's search queries.

Generating the preview, a recommendation for the preview, or a recommendation of a resource may comprise accessing data from sources in addition to or instead of those storing previous communication sessions. For example, communication application 120 may access internet-based sources, such as a website ("web source 132a"), a social-media platform ("social media 132b"), or a data-aggregation service ("outside service 132c"), such as a Real Simple Syndication (RSS) feed. In some embodiments, resource previews may be generated by communication application 120. In some embodiments, resource previews may be generated by the entity hosting the resource and the preview made available to communication application 120 by the entity.

In some embodiments, communication application 120 may access a service registry 134 to facilitate operations such as user authentication and generating a resource preview, recommending resource previews, or recommending a resource. Because access to the resource may be restricted by the entity hosting the resource, communication application 120 may need to authenticate one or more users with the entity before generating a preview of a resource, recommending a preview of the resource, or recommending a resource. Entities hosting resources may require different authentication Application Programing Interfaces (APIs) for requesting previews of resources. Service registry 134 may provide communication application 120 with the information necessary to gain access to the desired resource (e.g., authentication information). Entities hosting resources may have different Universal Resource Indicator formats for specifying resources. Service registry 134 may provide communication application 120 with the information necessary to specify which resource or resources communication application 120 needs to generate a preview for. Service registry 134 may use one or more established protocols to monitor or broker interactions between communication application 120 and entities hosting resources to automatically update itself with information communication application 120 may need to access resources from the entities in the future. Such protocols may include, for example, proxy APIs accessed via HTTP, Webhooks accessed via HTTP, REST hooks accessed via HTTP, pub/sub event subscription APIs accessed via Web sockets. One or more users may edit entries in service registry 134 through an interface.

It should be noted that the term "user" is being used in the interest of brevity and may refer to any of a variety of entities that may be associated with a subscriber account such as, for example, a person, a bot or artificial intelligent (AI) agent, an organization, an organizational role within an organization, a group within an organization, etc. The user devices can include a variety of devices, such as mobile phones, landline phones, Voice over IP (VOIP) phones, gateways, audio and/or video conferencing devices, gaming consoles, personal computers, laptops, smartwatches, or tablets. The user devices may be installed with software that supports conferencing, such as web browsers, a web-based real time communications (WebRTC) client application, a mobile app, or the like.

Figure 1B:
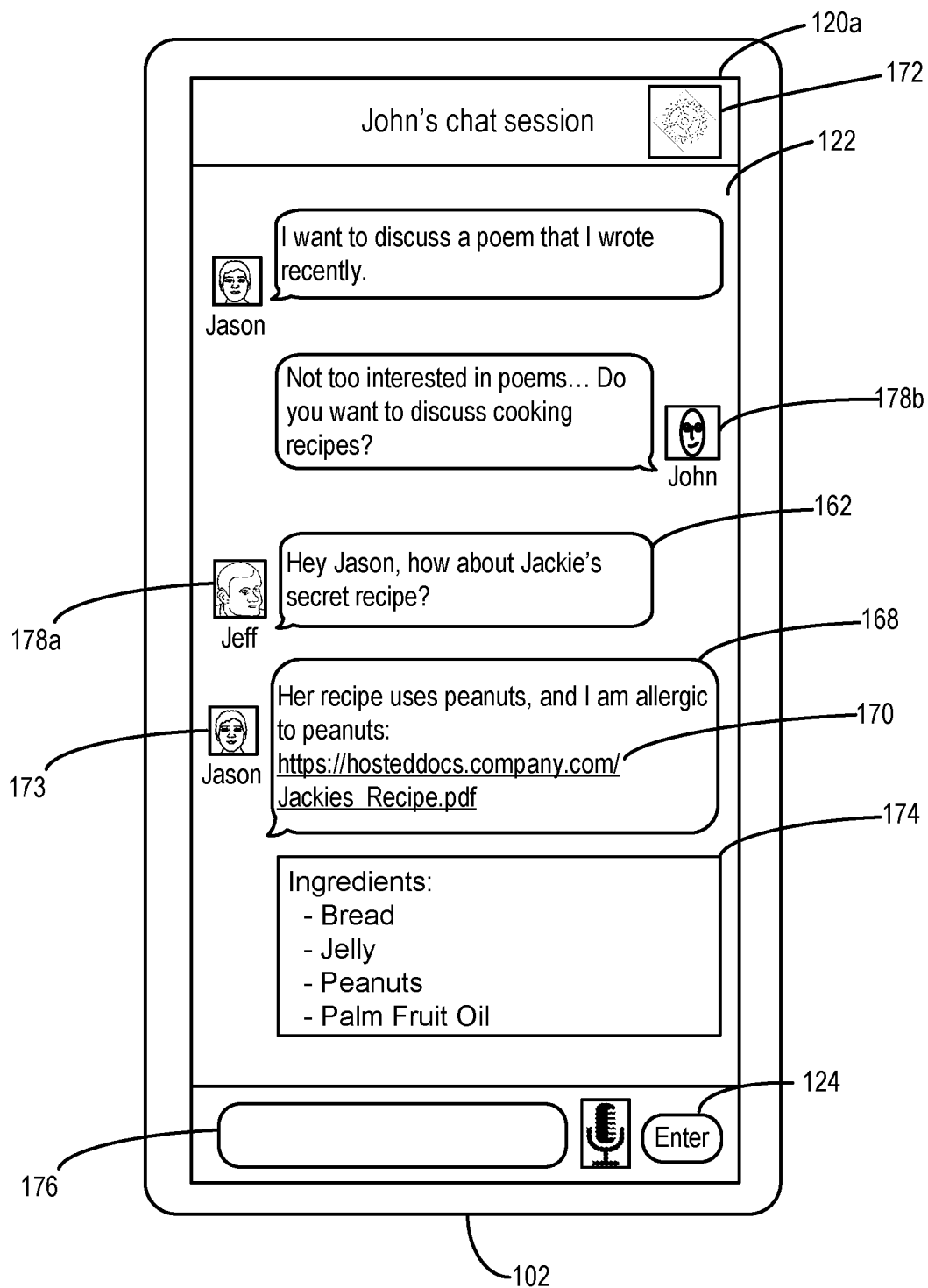
FIG. 1B is a diagram of an example of operation of a communication-service client, consistent with the disclosed embodiments.

FIG. 1B illustrates an example of operation of communication-service client 120a, consistent with embodiments of the present disclosure. Communication-service client 120a may operate on a user device (e.g., user device 102) to provide a display interface 122. Display interface 122 can display the content of, for example, chat messages. Content of chat messages may comprise, for example, text, image, and/or video content. Communication-service client 120a may also provide an input interface 124 for submitting chat messages. A user may submit a message by, for example, entering text into text box 176 and submitting the entered text to other users by selecting Enter button 124.

Consistent with embodiments of the present disclosure, a user in the communication session (e.g., a sender) may want to share a resource with one or more users (e.g., recipients). The sender may be referred to as sender 173, illustrated in FIG. 1B with an image of a fictional user, Jason. The recipients may be referred to as recipients 178a and 178b, illustrated in FIG. 1B with images of fictional users Jeff and John, respectively. The resource may be, for example, a document or a website. Interface 122 may display a link to the resource, such as link 170. When sender 173 sends a reference to the resource, such as link 170, and/or when one or more recipients receives link 170, communication-service client 120a may display information from or about the resource to the recipient, such as a preview of the resource. For example, if the resource is a document, communication-service client 120a may display a portion of or an excerpt from the document ("preview 174"). The recipient may access the resource by selecting link 170 within communication-service client 120a. Preview 174 may conform to a standard such as oEmbed. Preview 174 may be automatically displayed when message 168 is received, when a user hovers a cursor over it, when a user selects it, when a user performs a touch gesture, and/or when a user otherwise instructs communication application 120 to display preview 174.

Consistent with embodiments of the present disclosure, preview 174 may be generated or recommended based on one or more factors analyzed by communication application 120. Preview 174 may be generated and displayed to the recipient without any selections being made by the sender or recipient regarding what preview to display. In some embodiments, one or more previews may be generated and then recommended to the sender or the recipient. Such a recommendation may be, for example, a request that the sender or recipient select a preview to display from a set of multiple previews or a request to approve a single preview for display. The factors may be related to at least one of the recipient, the sender, or the environment. When the considered factors are related to the recipient, the preview may be considered a "recipient-based preview." When the considered factors are related to the sender, the preview may be considered a "sender-based preview." When the considered factors are related to the environment, the preview may be considered an "environment-based preview." Communication application 120 may be configured to use the factors specified in a preview-setting profile. The preview-setting profile may be a profile associated with a user, such as a sender requesting to send a link to a resource to a recipient. The preview-setting profile may be a profile associated with a recipient receiving a communication from the sender that contains a reference to a resource. The preview-setting profile may specify how the resource preview is to be generated and/or displayed. In some embodiments, the preview-setting profile may be a profile associated with an environment of a recipient receiving a communication from the sender that contains a reference to a resource.

Figure 1C:
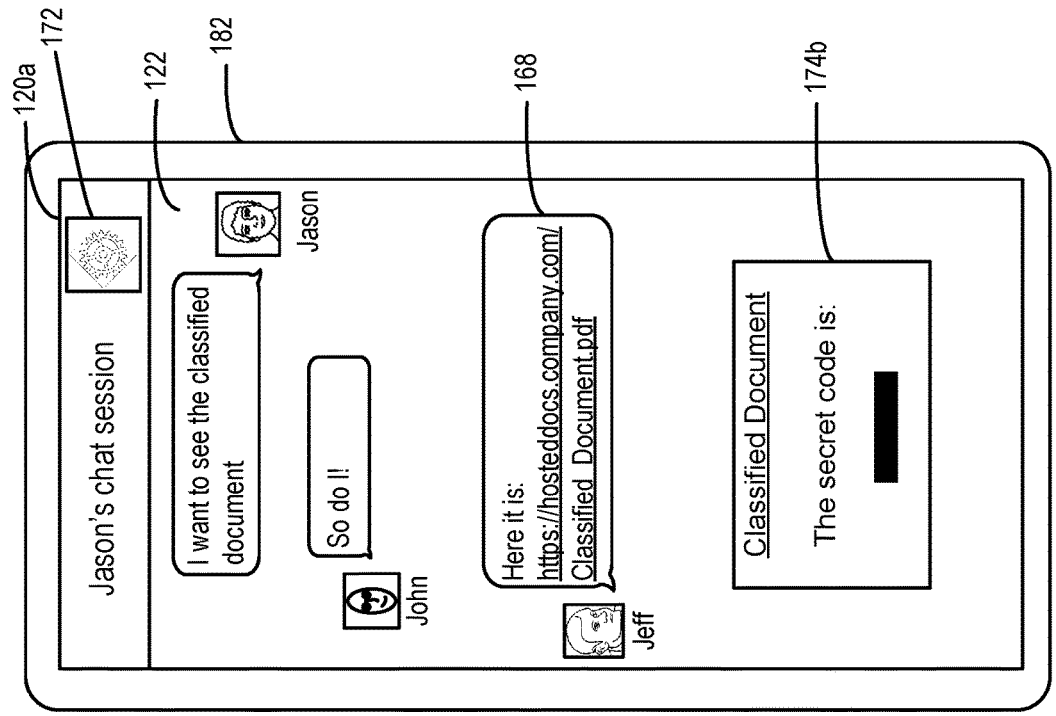
FIG. 1C is a diagram of an example of operation of a communication-service client, consistent with the disclosed embodiments.
Figure 1C:
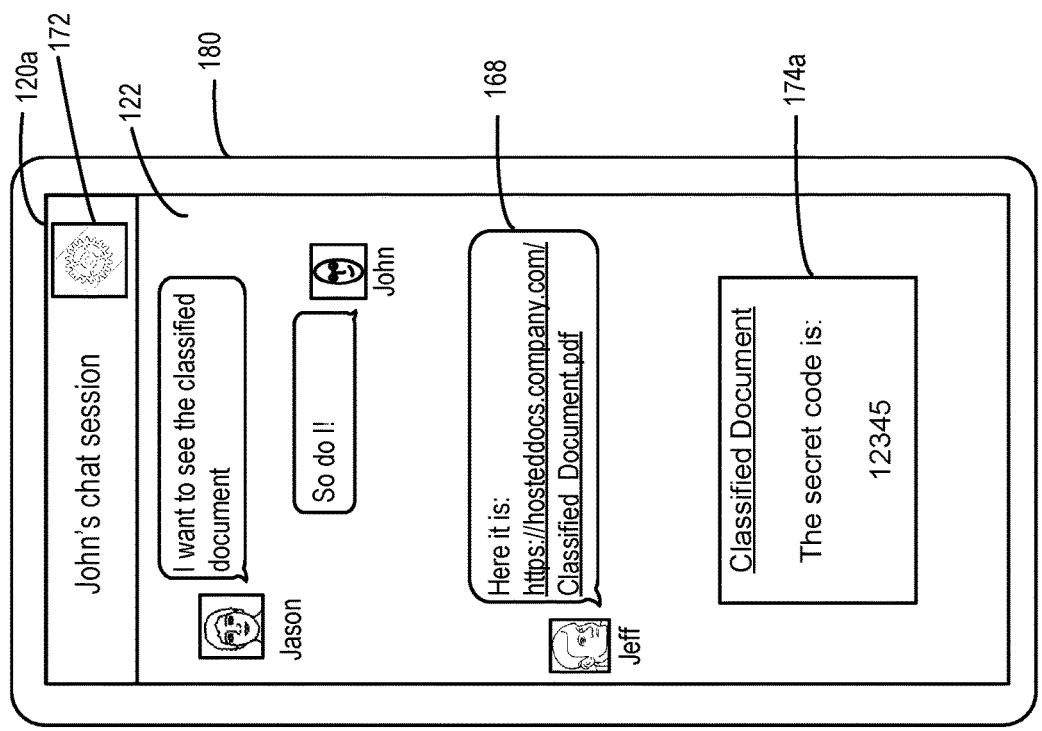

A recipient-based preview may comprise a preview that is determined by one or more user attributes associated with the recipient. One such user attribute may be access privileges associated with the recipient. Access privileges may comprise credentials, security clearance, or authentication information stored in service registry 134 in association with the recipient. For example, the recipient's credentials may permit the user to only see certain portions of a resource. If the recipient-based preview is determined at least in part by authentication information associated with the recipient, the generated or recommended preview of the resource may contain only those portions of the resource that the recipient may view in accordance with his or her credentials. In an embodiment illustrated in FIG. 1C, John and Jason may be recipients of a communication 168 referencing a resource having classified information. John's device 180 may display the secret code "12345" in preview 174a because John has the proper credentials, clearance, or authentication information to see the secret code. Jason's device 182 may display a preview 174b with the secret code redacted because Jason does not have the proper credentials, clearance, or authentication information to see the information.

Jason's device may be considered to be displaying a portion of the resource (i.e., the portion that is not redacted and that contains the redacted secret code).

Figure 1D:
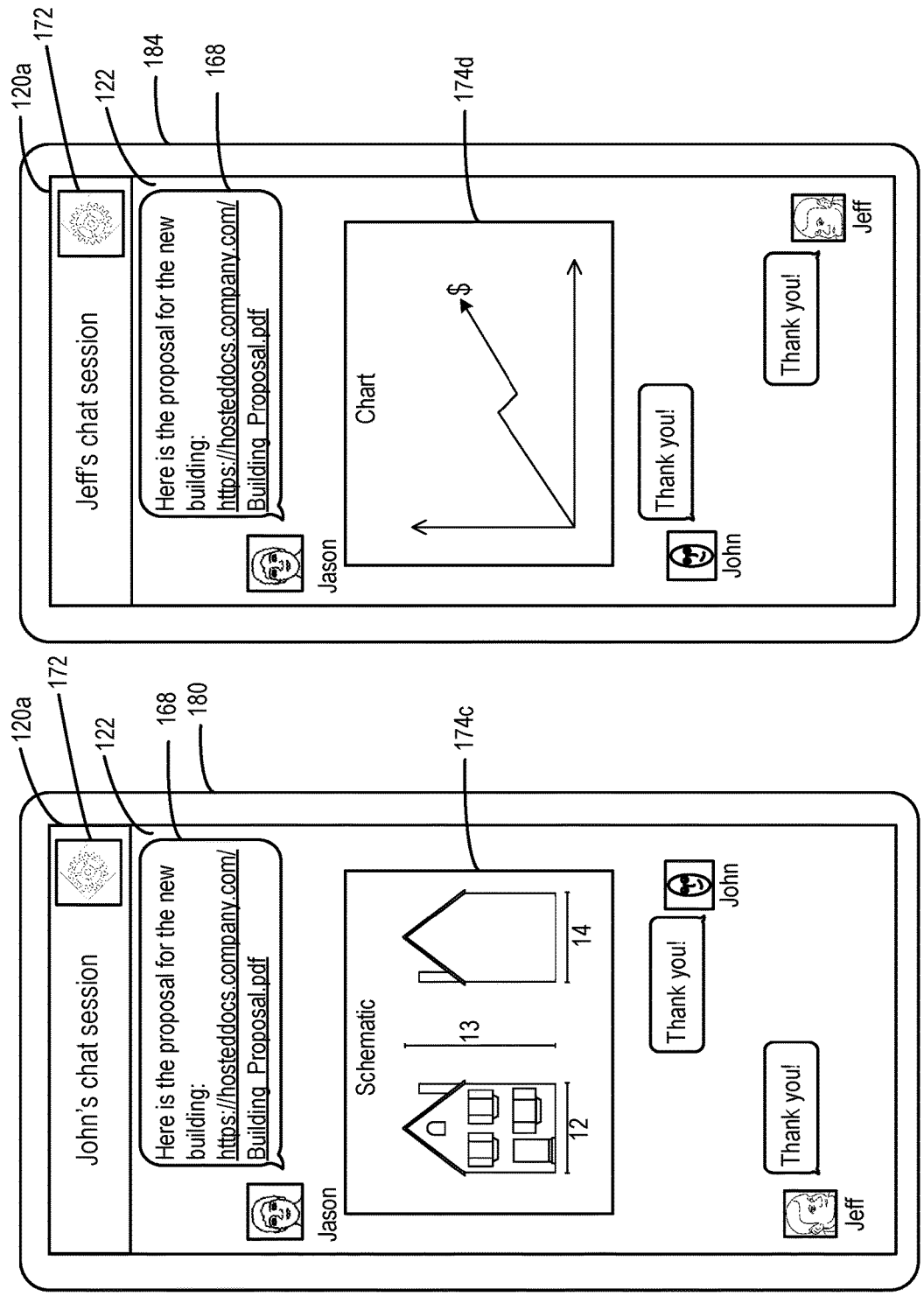
FIG. 1D is a diagram of an example of operation of a communication-service client, consistent with the disclosed embodiments.

Instead or in addition, the recipient's position or responsibilities within an organization may be used as a user attribute for generating or recommending a preview. For example, if the recipient is an architect in a building-construction firm receiving a link to a document describing a proposal for a new building, the preview displayed to the architect may be a portion of the document pertaining to the architecture of the building instead of, for example, financing details. In an embodiment illustrated in FIG. 1D, John and Jeff may be recipients of a communication 168 referencing a resource having an architectural schematic and a financial chart. John's device 180 may display a preview 174c with the architectural schematic because John is an architect. Jeff's device 184 may display a preview 174d with a financial chart because Jeff is a finance employee.

Instead or in addition, the recipient's interests may be used as a user attribute for generating or recommending a preview. Interests associated with a user may be determined from, for example, words appearing often in the user's chat messages, words appearing often on webpages visited by the user, or words appearing often in the user's search queries in online search engines or search mechanisms within the user's organization's Information Technology system. In some embodiments, words may be stored in database 126 with a timestamp reflecting when a word was last encountered in the user-interest analysis. In this case, words that were encountered more recently (e.g., words used in a search query by the user more recently than others) may be scored higher than other words even if the other words were encountered more times. Based on this analysis, communication application 120 may generate or recommend a preview of a resource that is a portion thereof and that contains a word associated with the recipient and his or her interest. Instead or in addition, the recipient's predicted level of understanding of a resource being shared or a topic being discussed may be used as a user attribute for generating or recommending a preview. The user's level of understanding may be predicted from data describing, for example, the amount of experience a user has at a company. For example, database 126 may contain user-attribute data indicating that the recipient is, for example, an engineer with only one year of experience. In this case, if a resource containing a simplified schematic and a full-detail schematic of a circuit is referenced by a sender in a conversation using the word "schematic" multiple times, communication application 120 may generate or recommend a preview of the resource that displays a portion containing the simplified schematic to the recipient.

A sender-based preview may comprise a preview that is determined by one or more user attributes associated with the sender. These attributes may be the same or similar to those described above with respect to recipient-based previews. For example, the preview may be generated or recommended based on access privileges associated with the sender. Instead or in addition, the preview may be generated or recommended based on the sender's position or responsibilities with an organization. Instead or in addition, the preview may be generated or recommended based on the sender's predicted level of understanding of a topic being discussed. Instead or in addition, the preview may be generated or recommended based on the sender's interests.

Figure 1E:
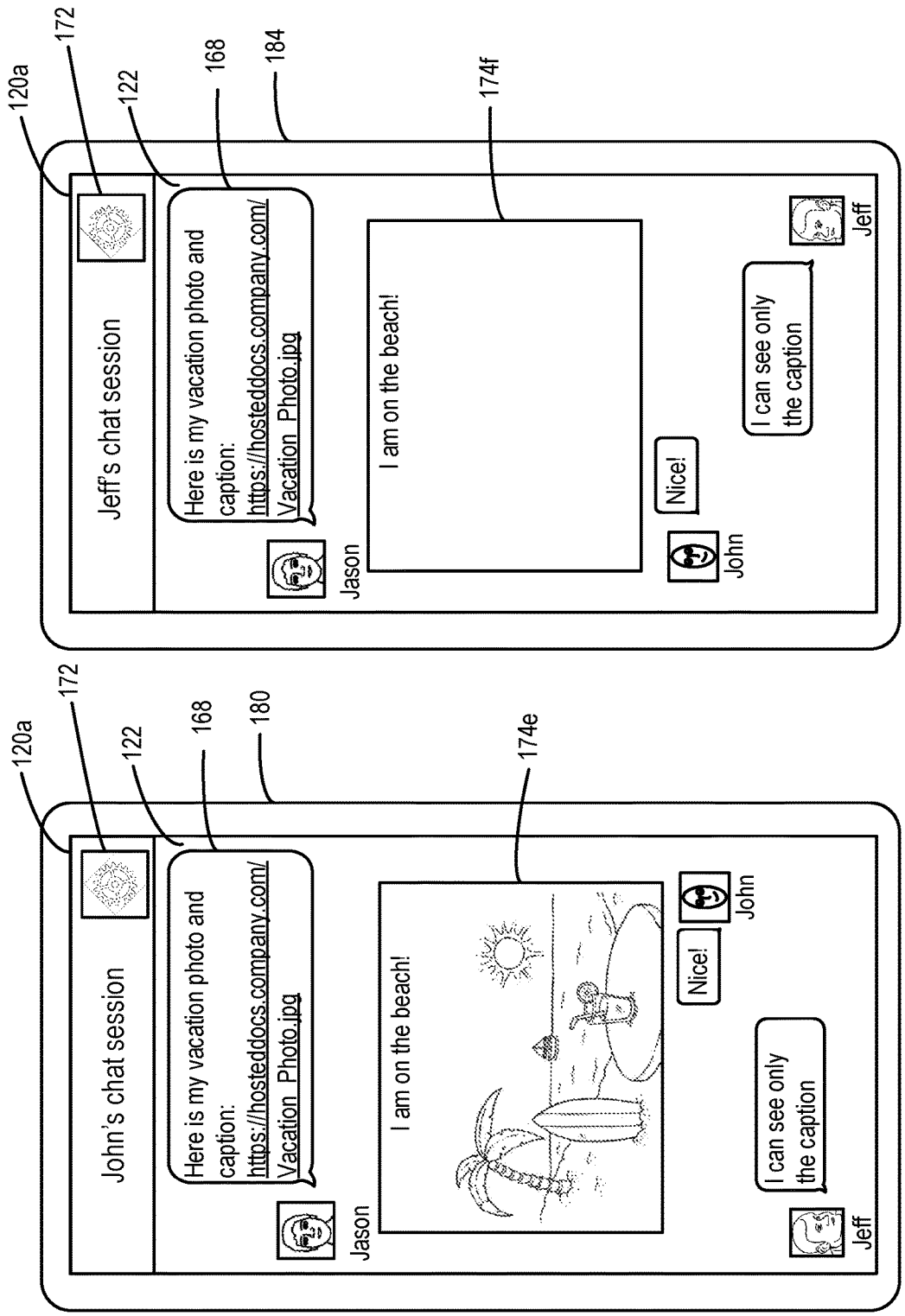
FIG. 1E is a diagram of an example of operation of a communication-service client, consistent with the disclosed embodiments.

An environment-based preview may comprise a preview that is determined by at least one of the application being used for communication by the sender or the recipient, the device being used for communication by the sender or the recipient, the communication format being used by the sender or the recipient, or the content of the communication session. If the environment-based preview is determined by the application being used for communication by the sender or the recipient, communication application 120 may generate a resource preview tailored to the application being used. For example, if the application being used for communication by the recipient only supports text-based messaging, the preview generated for the recipient may contain only text. Instead or in addition, if the environment-based preview is determined by the device being used for communication by the sender or the recipient, communication application 120 may generate a resource preview tailored to the device being used. For example, if a communication device used by the recipient is a small-screen device, the preview generated for the recipient may have a low resolution. Instead or in addition, if the environment-based preview is determined by the format being used by the sender or the recipient, communication application 120 may generate a resource preview tailored to the format being used. For example, if the recipient has enabled a hands-free mode on their device for use while operating a car, the preview generated for the recipient may be an audio file that is automatically played. In an embodiment illustrated in FIG. 1E, John and Jeff may be recipients of a communication 168 referencing a resource having text and a photograph. In this example, the photograph may take up a large amount of computer memory relative to the text. John's device 180 may display a preview 174e with both the text and the photograph because John's device is capable of receiving and displaying the text and the photograph (e.g., because John's device 180 has a high-bandwidth internet connection). Jeff's device 184 may display a preview 174f with the text and without the photograph because Jeff's device 184 is not capable of receiving and/or displaying the text and the photograph (e.g., because Jeff's device 184 has a low-bandwidth internet connection).

Instead or in addition, if the environment-based preview is determined by the content of the communication session, communication application 120 may generate a resource preview tailored to the content of the communication session. Accordingly, if the communication session has a word that appears shortly before the link to the resource, the preview generated for the recipient may be a portion of the resource that contains the word. An example of this is illustrated in FIG. 1B. When sender 173 sends message 168, requesting that a link associated with a resource be sent from the sender to recipients 178a and 178b, communication application 120 may determine that message 168 contains the word "peanuts." Communication application 120 may search the referenced resource (e.g., a recipe) for a portion containing the word "peanuts" and display a preview 174 of the resource that contains the word "peanuts" (e.g., the ingredients list).

In some embodiments, communication application 120 may recommend one or more previews to the sender requesting that a link associated with a resource be sent from the sender to the recipient. These previews may be generated before being recommended to the sender. The preview may be generated for recommendation using one or more of the methods consistent with embodiments of the present disclosure. In some embodiments, a recommendation-setting profile associated with the sender or one or more intended recipients may be accessed to generate the resource preview recommendations. The recommendation-setting profile may be similar to the preview-setting profile but may be used instead of or in addition to the preview-setting profile when making recommendations for resource previews. The sender may be given the option of selecting and, in some embodiments, modifying or designating the preview they want displayed to one or more recipients. In some embodiments, communication application 120 may display one or more previews that are associated with each recipient to the sender. For example, if the sender is chatting with a first and second recipient, communication application 120 may display one set of previews for selection by the sender to display to the first recipient and display a second set of previews for selection by the sender to display to the second recipient. The sender may select icon 172 to alter preview settings. The sender may designate a particular portion of a resource to display as a preview to one or more recipients. The sender may designate different portions for display as previews to different recipients.

In some embodiments, communication application 120 may recommend resources to send or display a link to and preview for when a sender composes a communication, when the sender has finished composing a communication, or when the recipient receives the communication. This may be done based on the recommendation-setting profile, which may comprise content of the communication and/or user attributes associated with the sender and/or one or more intended recipients. Communication application 120 may search web source 132a, social media 132b, and/or outside service 132c for resources relevant to the composed communication using, for example, various information-hosting entities' APIs for resource retrieval and/or updating. The discovered resources may be recommended to the sender or the recipient. The resources may be recommended based on popularity on social media, indexing data created by web-based search engines, or popularity with a subset of users (e.g., users belonging to a particular organization). Discovered resources may be based on their publication dates or times (e.g., recommending the most recently published or updated resource), reputation, or known verifiable notoriety (e.g., published academic journals or online encyclopedias).

In some embodiments, senders may temporarily or permanently confer their own credentials for accessing the resource they reference in a communication on one or more recipients of the communication. Senders may temporarily or permanently confer their own credentials for viewing a preview of the resource they are referencing in a communication on one or more recipients of the communication. Authentication services may be provided by communication application 120, by the entity hosting the resource, or both. Communication application 120 may prompt the sender to specify how to handle previews displayed to users if communication application 120 determines that a preview would otherwise be displayed to a recipient who does not have the ability because of, for example, credentials or device type, to view the preview. This prompt may occur before or after the communication is sent to recipients.

In some embodiments, the recipient may be asked to provide credentials to view a preview that requires authentication. The user may submit credentials when starting communication application 120, the communication session, receiving the preview, and/or at another time.

In some embodiments, the link to a resource displayed in a received communication may be updated by communication application 120 after the communication is received if communication application 120 determines that an updated version of the resource exists. For example, communication application 120 may use an API provided by web source 132a or other information-hosting entity to request an updated link to updated versions of the received resource. In some embodiments, communication application 120 may update the preview if it determines that the previously displayed preview no longer applies to the updated resource.

While at least some described embodiments pertain to chat messages, similar systems may be implemented using other forms of communication, such as e-mail. In some embodiments, communication application 120 may send an e-mail to a recipient if he or she was not participating or present in the communication session when a communication was sent.

Figure 2:
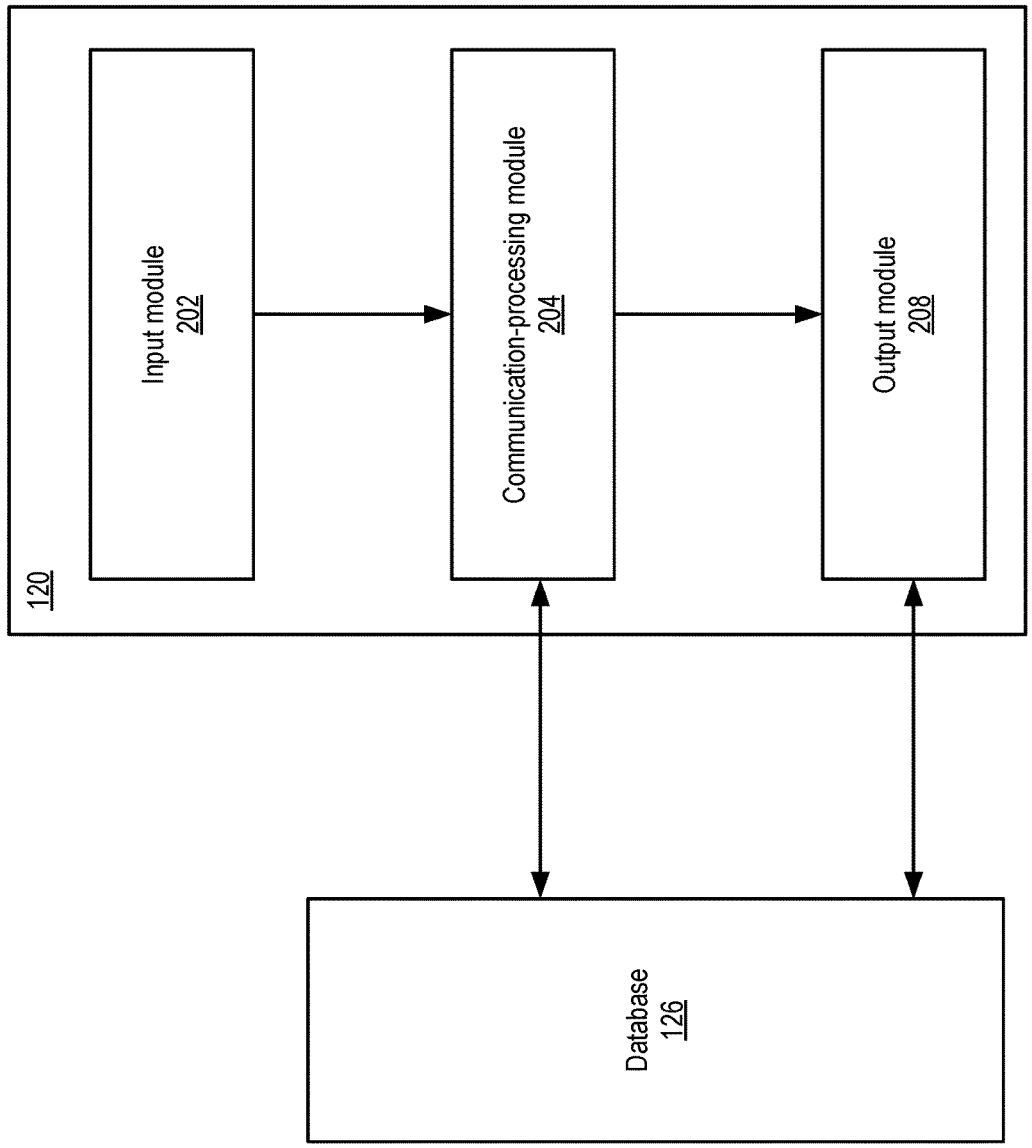
FIG. 2 is a diagram illustrating an example of an architecture of a communication application, consistent with disclosed embodiments.

Reference is now made to FIG. 2, which illustrates an example of an architecture of communication application 120, consistent with embodiments of the present disclosure. Communication application 120 may include an input module 202, a communication-processing module 204, and an output module 208. Some or all of these modules can be software modules. These components can also be split between chat service client 120a (hosted on a user device, such as user device 106) and communication-service server 120b (hosted on a server, such as communication server 108). Communication application 120 may be coupled with database 126. Database 126 can be hosted on the same system that operates chat application 120 or hosted on a different system.

Input module 202 can receive data of a new communication (e.g. new chat message 162) from, for example, device 102. The communication may include at least one of text data, image data, video data, or audio data. In a case where input module 202 is a part of communication service server 120b, input module 202 can receive the communication via a network interface (not shown) of user device 102. Input module 202 can receive data from a recipient's device (e.g., a device which is to receive the communication). The data may include, for example, the model number of the recipient's device, the operating mode of the recipient's device, and activity or interest data associated with the recipient. Input module 202 can transmit the data of the new communication to communication-processing module 204 for processing.

Communication-processing module 204 can process the communication data to extract content information for determining what preview to generate for a resource referred to in the communication. For example, communication-processing module 204 can perform natural language processing (NLP) on the text data included in the communication. The processing may include, for example, morphological segmentation, part-of-speech tagging, etc. As a part of the processing, communication-processing module 204 may derive a set of words from the communication data that are determined to best represent the information content of the communication data. Communication-processing module 204 can obtain metadata associated with the referenced resource or generate descriptive data for the referenced resource by computer analysis of the resource using technologies such as Computer Vision, Artificial Intelligence, and Machine Learning. In some embodiments, communication-processing module 204 can provide the processed data to an interest determination module (not shown) to determine a likelihood of a user being interested in words or topics in the communication.

Communication-processing module 204 can store the processed data in database 126. Communication-processing module 204 can associate the processed data with other information. The information may include, for example, an identifier of the user who generated the communication data, a time point at which the user generated the communication data, etc. Communication-processing module 204 can store the associated information in database 126. In some embodiments, communication-processing module 204 may receive a preview-setting profile from database 126 and it may process the communication based on data contained in the preview-setting profile. For example, if the preview-setting profile comprises a sender-based preview setting (e.g., a setting specifying that the preview should be a sender-based preview), communication-processing module may process the sender's activity to determine the sender's interests instead of or in addition to processing the recipient's activity to determine the recipient's interests. Communication-processing module 204 may process a recommendation-setting profile in addition to or instead of a preview-setting profile. In some embodiments, communication-processing module 204 may process the recommendation-setting profile in a manner similar to how it processes preview-setting profile.

Output module 208 may receive a preview-setting profile. Output module 208 may receive the preview-setting profile and/or recommendation-setting profile from database 126 or communication-processing module 204. Output module 208 can generate or recommend one or more previews of a resource referenced in the communication based on the preview-setting profile. In some embodiments, output module 208 can generate a recommendation of a preview of a resource or a recommendation of a resource based on the recommendation-setting profile.

Figure 3A:
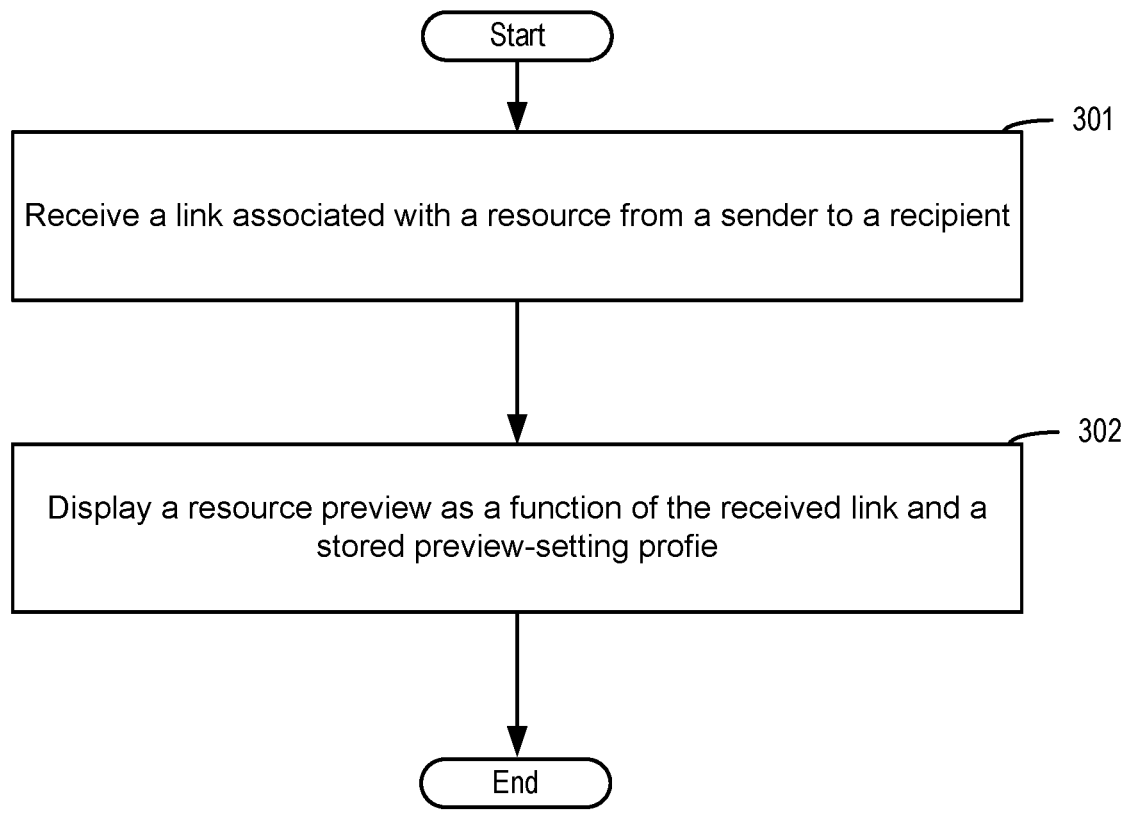
FIG. 3A is a flow chart illustrating an example of a method for generating a resource preview in a communication session, consistent with disclosed embodiments.

FIG. 3A is a flow chart illustrating an example of a method 300 for generating a resource preview in a communication session. The steps associated with this example process can be performed by the components of, for example, FIG. 2. In the following description, reference is made to certain components of FIG. 2 for purposes of illustration. It will be understood, however, that other implementations are possible and that components other than those illustrated in FIG. 2 can be utilized to implement the example method of FIG. 3A. While the flow chart of FIG. 3A discloses the steps in a particular order, it will be understood that at least some of the steps can be moved, modified, or deleted where appropriate, consistent with the teachings of the present disclosure.

Method 300 may comprise receiving a link associated with a resource from a sender to a recipient (step 301). Method 300 may comprise displaying a resource preview as a function of the received link and a stored preview-setting profile (step 302). The preview-setting profile may comprise at least one of a recipient-based preview setting, an environment-based preview setting, or a sender-based preview setting. Displaying the resource preview may comprise generating the resource preview based on at least one of a received recipient profile, data derived from a communication session, data derived from an environment associated with the recipient, a received sender profile, or a received sender selection. It is to be understood that "displaying" may refer to any manner of providing information, such as playing audio containing the information.

Figure 3B:
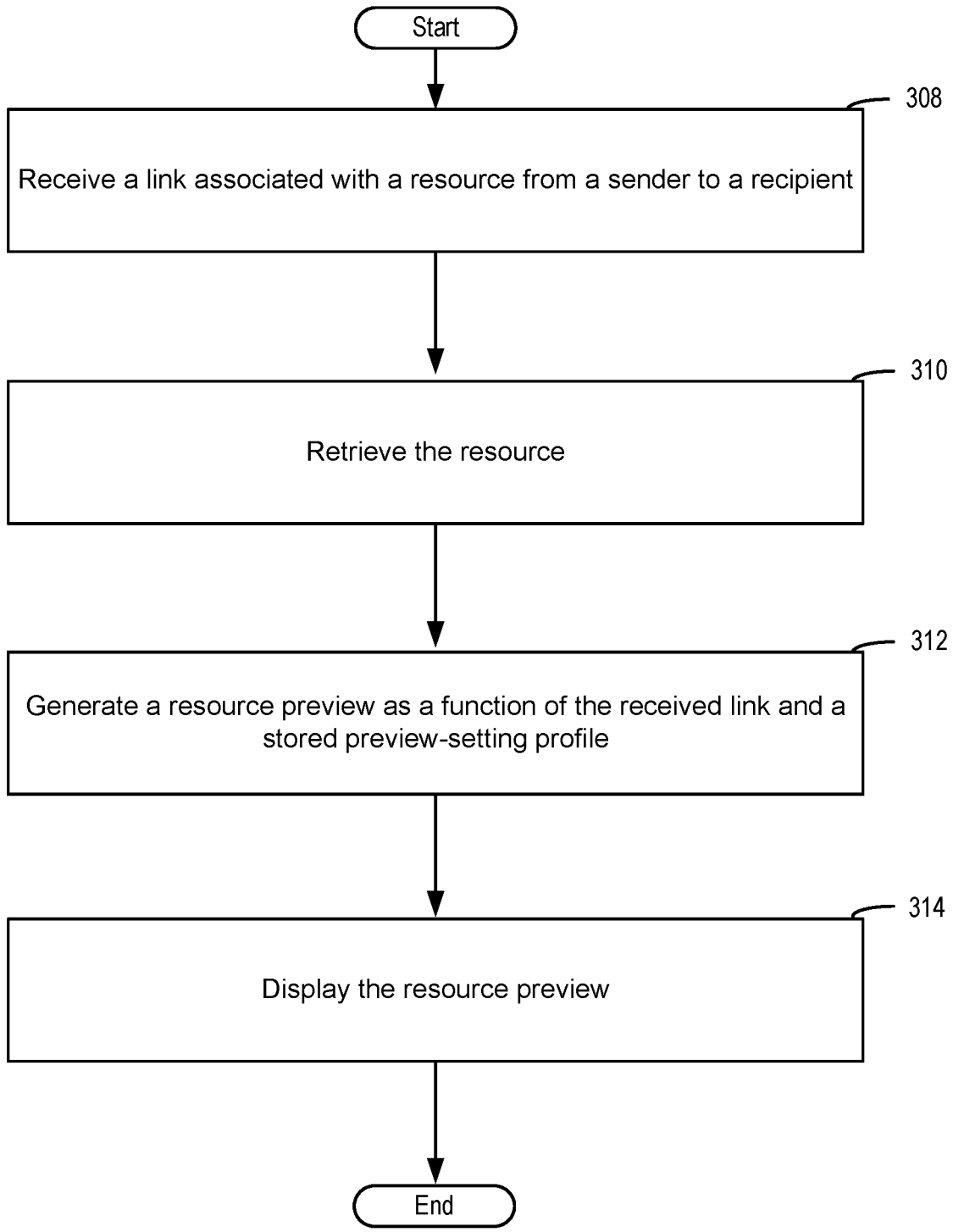
FIG. 3B is a flow chart illustrating an example of a method for generating a resource preview in a communication session, consistent with disclosed embodiments.

FIG. 3B is a flowchart illustrating an example of a method 306 for generating a resource preview in a communication session. The steps associated with this example process can be performed by components of, for example, FIG. 2. In the following description, reference is made to certain components of FIG. 2 for purposes of illustration. It will be understood, however, that other implementations are possible and that components other than those illustrated in FIG. 2 can be utilized to implement the example method of FIG. 3B. While the flow chart of FIG. 3B discloses the steps in a particular order, it will be understood that at least some of the steps can be moved, modified, or deleted where appropriate, consistent with the teachings of the present disclosure.

Method 306 may comprise step 308, which may be substantially similar to step 301 described above with respect to method 300. Method 300 may comprise retrieving or receiving the resource (step 310). The resource may be received from, for example, web source 132a, social media 132b, or outside service 132c. Method 306 may comprise generating a resource preview (step 312). The resource preview may be generated by, for example, output module 208, using one or more disclosed methods. For example, the resource preview may be generated as a function of the received link and a stored preview-setting profile. Method 306 may comprise step 314, which may be substantially similar to step 302 described above with respect to method 300.

Figure 3C:
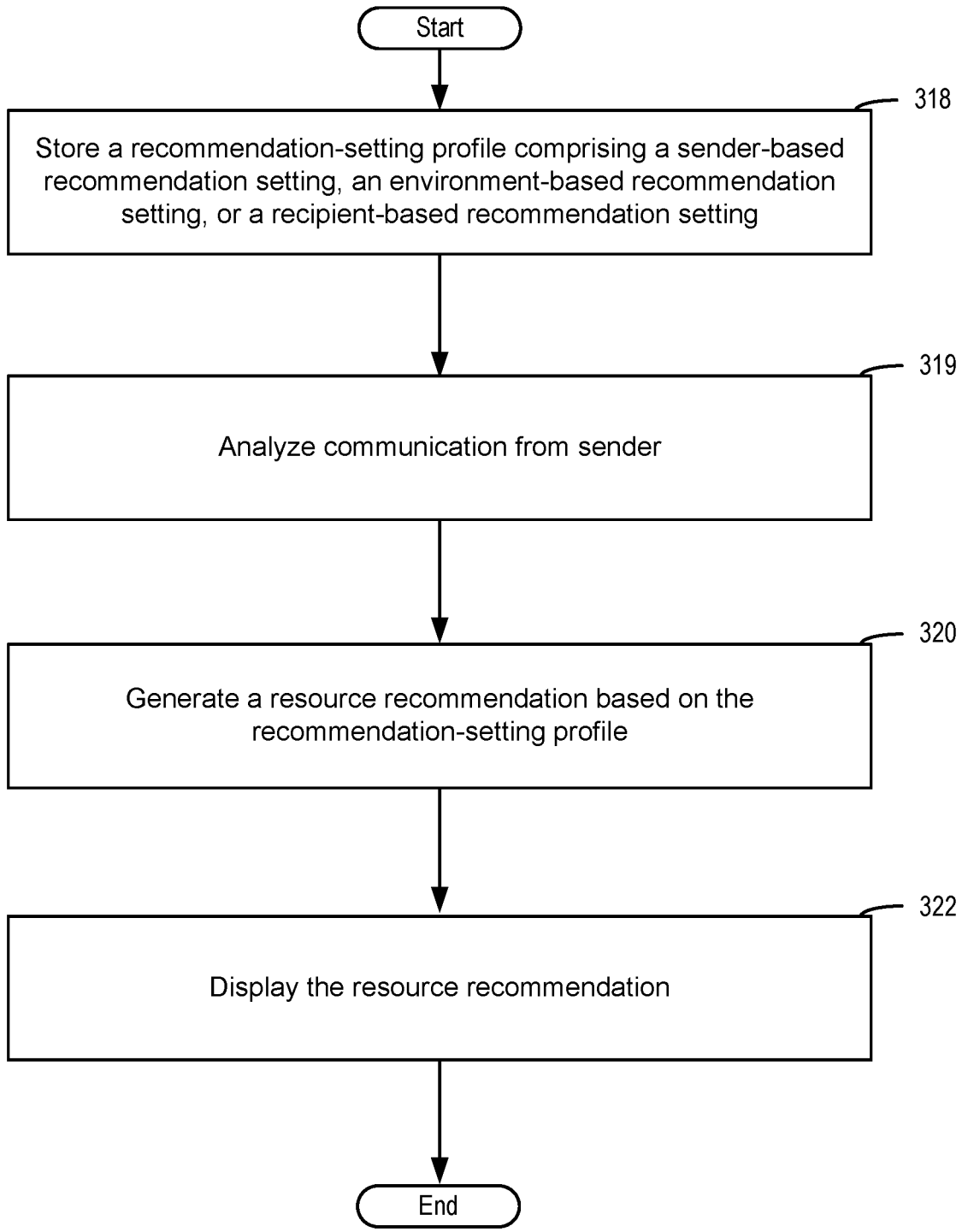
FIG. 3C is a flow chart illustrating an example of a method for generating a resource preview in a communication session, consistent with disclosed embodiments.

FIG. 3C is a flowchart illustrating an example of a method 316 for generating a resource preview in a communication session. The steps associated with this example process can be performed by components of, for example, FIG. 2. In the following description, reference is made to certain components of FIG. 2 for purposes of illustration. It will be understood, however, that other implementations are possible and that components other than those illustrated in FIG. 2 can be utilized to implement the example method of FIG. 3C. While the flow chart of FIG. 3C discloses the steps in a particular order, it will be understood that at least some of the steps can be moved, modified, or deleted where appropriate, consistent with the teachings of the present disclosure.

Method 316 may comprise storing a recommendation-setting profile comprising at least one of a sender-based recommendation setting, an environment-based recommendation setting, or a recipient-based recommendation setting (step 318). The recommendation-setting profile may be stored in, for example, database 126. Method 316 may comprise analyzing a communication the sender is composing, has begun sending, or has previously sent (step 319). In some embodiments, step 319 may not be performed or may be optional. Method 316 may comprise generating a resource recommendation based on at least the recommendation-setting profile (step 320). The resource recommendation may be generated by, for example, output module 208, using one or more disclosed methods. In some embodiments, the resource recommendation may be generated by analyzing the communication the sender is composing, has begun sending, or has previously sent. Method 306 may comprise displaying the resource recommendation (step 322). It is to be understood that "displaying" may refer to any manner of providing information, such as playing audio containing the information.

Figure 4:
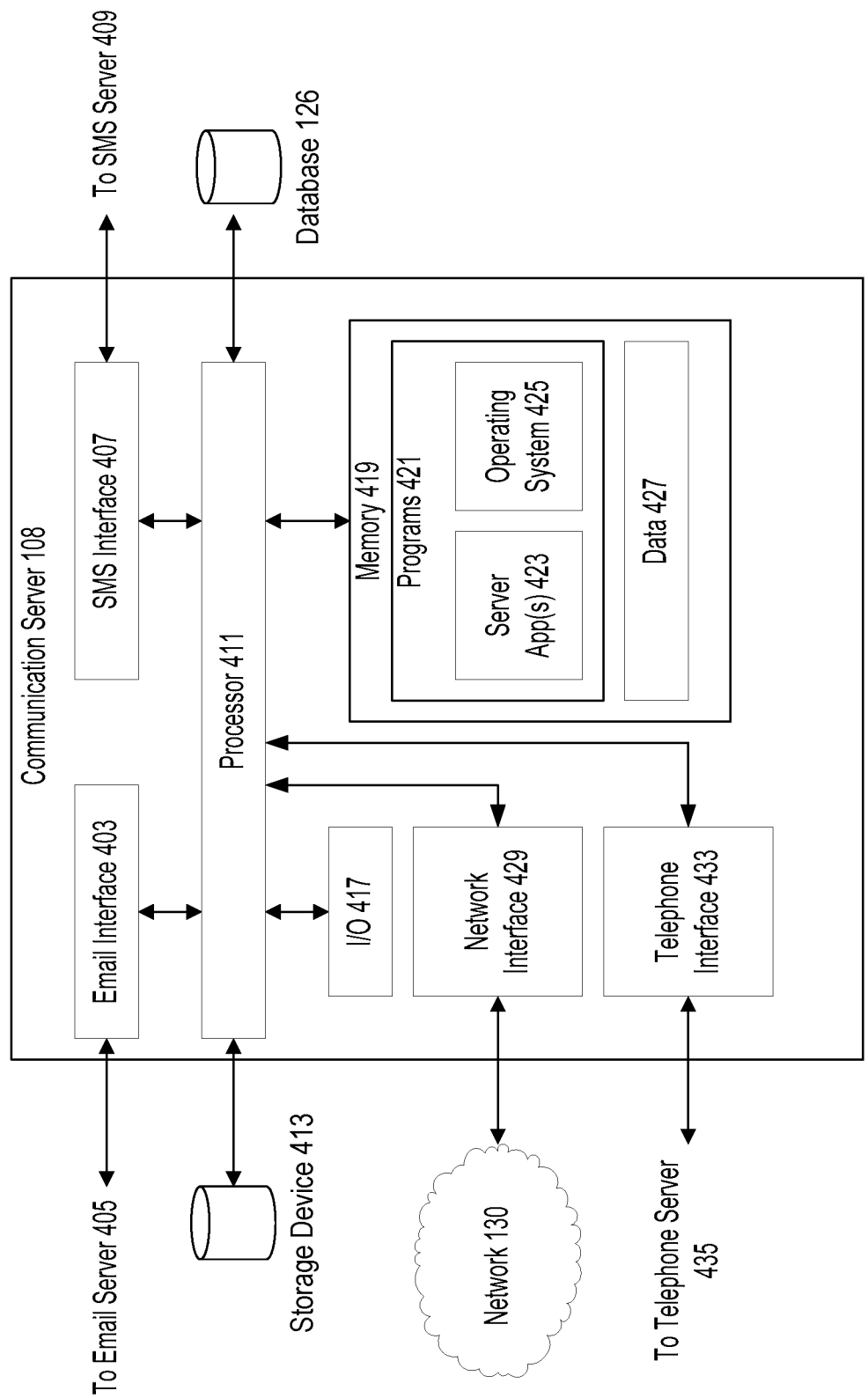
FIG. 4 is a diagram illustrating an example of a computing system.

FIG. 4 is a block diagram that illustrates an example of computing system 400 suitable for implementing the disclosed systems and methods. System 400 may include a communication server 108. Communication server 108 may include email interface 403 operably connected to a server, such as an external email server 405. Communication server 108 may include an SMS interface 407 operably connected to a server, such as an external SMS server 409. Although depicted as separate in FIG. 4, email server 405 may reside on communication server 108 or on the same server farm as communication server 108. Similarly, SMS server 409 may reside on communication server 108 or on the same server farm as communication server 108.

As depicted in FIG. 4, communication server 108 may include at least one processor, e.g., processor 411. Processor 411 may be operably connected to email interface 403, SMS interface 407, one or more databases (e.g., database 126), one or more storage devices (e.g., storage device 413), an input/output module 417, memory 419, and/or other components of communication server 108. Email interface 403, SMS interface 407, and/or one or more processors 411 may comprise separate components or may be integrated in one or more integrated circuits.

I/O module 417 may be operably connected to a keyboard, mouse, touch screen controller, and/or other input controller(s) (not shown). Other input/control devices connected to I/O module 417 may include one or more buttons, rocker switches, thumb-wheel, infrared port, USB port, and/or a pointer device such as a stylus.

Processor 411 may be operably connected to memory 419. Memory 419 may include high-speed random access memory and/or non-volatile memory, such as one or more magnetic disk storage devices, one or more optical storage devices, and/or flash memory (e.g., NAND, NOR). Memory 419 may include one or more programs 421.

For example, memory 419 may store an operating system 425, such as DRAWIN, RTXC, LINUX, iOS, UNIX, OS X, WINDOWS, or an embedded operating system such as VXWorkS. Operating system 425 may include instructions for handling basic system services and for performing hardware dependent tasks. In some implementations, operating system 425 may comprise a kernel (e.g., a UNIX kernel).

Memory 419 may store one or more server applications 423 to facilitate communicating with one or more additional devices, one or more computers, and/or one or more servers. Server applications 423 may include instructions to execute one or more of the disclosed methods.

Memory 419 may store data 427. Data 427 may include transitory data used during instruction execution. Data 427 may include data recorded for long-term storage.

At least some of the above identified instructions and applications may correspond to a set of instructions for performing one or more functions described above. These instructions need not be implemented as separate software programs, procedures, or modules. Memory 419 may include additional instructions or fewer instructions. Various functions of communication server 108 may be implemented in hardware and/or in software, including in one or more signal processing and/or application-specific integrated circuits.

Communication functions may be facilitated through one or more network interfaces (e.g., interface 429). Network interface 429 may be configured for communications over Ethernet, radio frequency, and/or optical (e.g., infrared) frequencies. The specific design and implementation of network interface 429 may depend on the communication network(s) over which communication server 108 is intended to operate. For example, in some embodiments, communication server 108 may include wireless/wired network interface 429 that is designed to operate over a GSM network, a GPRS network, an EDGE network, a Wi-Fi or WiMax network, and/or a Bluetooth® network. In some embodiments, communication server 108 includes wireless/wired network interface 429 that is designed to operate over a TCP/IP network. Accordingly, network 130 may be any appropriate computer network compatible with network interface 429.

Communication functions may be facilitated through one or more telephone interfaces (e.g., interface 433). For example, telephone interface 433 may be configured for communication with a telephone server 435. Telephone server 435 may reside on communication server 108 or on the same server farm as communication server 108.

The various components in server 400 may be coupled by one or more communication buses or signal lines (not shown).

In the foregoing specification, embodiments have been described with reference to numerous specific details that can vary between implementations. Certain adaptations and modifications of the described embodiments can be made. Other embodiments can be apparent to those skilled in the art from consideration of the specification and practice of the invention disclosed herein. It is intended that the specification and embodiments described herein be considered as exemplary only, with the true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A computer-implemented method for generating a resource preview in a communication session between a sender and a recipient, the computer-implemented method comprising:
receiving a link associated with a resource;
receiving user-attribute data associated with the recipient;
based on the user-attribute data, determining a recipient's predicted level of understanding of the resource;
generating a recipient-based preview that includes a summary of the resource based on the recipient's predicted level of understanding of the resource; and
outputting the generated recipient-based preview of the resource.

2. The computer-implemented method of claim 1, wherein the sender is a bot or artificial intelligent (AI) agent configured to generate the summary of the resource with the degree of complexity or detail based on the recipient's predicted level of understanding of the resource.

3. The computer-implemented method of claim 1, wherein the resource includes a document or a website.

4. The computer-implemented method of claim 1, further comprising using Artificial Intelligence (AI) to generate the recipient-based preview of the resource.

5. The computer-implemented method of claim 1, wherein generating the summary of the resource in a manner that matches the at least one determined level includes determining a degree of complexity or detail based on the user-attribute data.

6. The computer-implemented method of claim 1, wherein the user-attribute data is indicative of an amount of experience the recipient has at a company, and the computer-implemented method includes: determining the recipient's predicted level of understanding based on the data indicative of the amount of experience the recipient has at the company.

7. The computer-implemented method of claim 1, wherein, the resource includes a simplified schematic and a full-detail schematic, and generating the recipient-based preview of the resource includes determining to include the simplified schematic and to exclude the full-detail schematic based on the recipient's predicted level of understanding of the resource.

8. The computer-implemented method of claim 1, further comprising determining a recipient's access privileges level and determining which portions of the resource the recipient can view based on the recipient's access privileges level and the recipient's predicted level of understanding of the resource.

9. The computer-implemented method of claim 8, wherein, the resource includes classified information, and generating the recipient-based preview of the resource includes determining to redact at least one portion of the resource based on the recipient's access privileges level.

10. The computer-implemented method of claim 1, further comprising accessing a database to retrieve stored user-activity data, wherein generating the recipient-based preview is based on the user-activity data.

11. The computer-implemented method of claim 1, wherein generating the recipient-based preview is based on the data from one or more previous communication sessions.

12. The computer-implemented method of claim 1, further comprising creating user-attribute data from words that commonly appear on websites accessed by the recipient or that appear in the recipient's search queries.

13. The computer-implemented method of claim 7, further comprising accessing at least one source in addition to a database storing the previous communication sessions to retrieve the data, wherein the at least one source includes an internet-based source, a social-media platform, or a data-aggregation service.

14. The computer-implemented method of claim 1, further comprising accessing data derived from an environment associated with the recipient, wherein generating the recipient-based preview is based on environment-based recommendation setting.

15. The computer-implemented method of claim 1, further comprising determining that the resource was updated, and updating the link.

16. The computer-implemented method of claim 1, wherein the user-attribute data describes one or more characteristics of the recipient.

17. The computer-implemented method of claim 1, further comprising determining whether to present the summary of the resource in an audible format or a textual format.

18. The computer-implemented method of claim 1, further comprising determining a likelihood of the recipient being interested in topics in the communication session.

19. A non-transitory computer readable medium containing instructions that when executed by at least one processor cause the at least one processor to perform operations for generating a resource preview in a communication session between a sender and a recipient, the operations comprising:
receiving a link associated with a resource;
receiving user-attribute data associated with the recipient;
based on the user-attribute data, determining a recipient's predicted level of understanding of the resource;
generating a recipient-based preview that includes a summary of the resource based on the recipient's predicted level of understanding of the resource; and
outputting the generated recipient-based preview of the resource.

20. A system for generating a resource preview in a communication session between a sender and a recipient, the system comprising at least one memory device storing computer-executable instructions and at least one processor configured to execute the stored instructions to:
receiving a link associated with a resource;
receiving user-attribute data associated with the recipient;
based on the user-attribute data, determining a recipient's predicted level of understanding of the resource;
generating a recipient-based preview that includes a summary of the resource based on the recipient's predicted level of understanding of the resource; and
outputting the generated recipient-based preview of the resource.

21. The computer-implemented method of claim 1, wherein the user-attribute data is received from a database hosted outside a device configured to output the generated recipient-based preview of the resource.

22. The computer-implemented method of claim 1, wherein the user-attribute data is indicative of training or academic qualifications of the recipient, and the computer-implemented method includes: determining the recipient's predicted level of understanding based on the training or academic qualifications of the recipient.

* * * * *